Patented May 2, 1933

1,906,713

UNITED STATES PATENT OFFICE

CLINTON HENRY PARSONS, OF CHICAGO, ILLINOIS, ASSIGNOR TO SWIFT & COMPANY, OF CHICAGO, ILLINOIS, A CORPORATION OF ILLINOIS

TREATMENT OF CREAM FOR BUTTER MAKING

No Drawing.   Application filed January 17, 1931. Serial No. 509,549.

This invention relates to improvements in the treatment of cream for butter making, and more particularly to the treatment of off-flavored cream for the production therefrom of high grade cream and high grade butter.

In the manufacture of butter a starter culture is usually added to the cream for the purpose of producing more of the desirable butter flavor and aroma in the resulting butter. After cream has been properly ripened by means of these starter cultures, it is churned until the milk fat globules coalesce into butter, the serum separating into a separate portion called buttermilk. The buttermilk is removed and the butter granules are then washed and worked into butter.

The butter which is made from fresh cream, and from cream which has been properly handled, is a high grade butter; but butter which is made by churning off-flavored cream, which has been improperly handled, and which has both sour and putrefactive flavors, will ordinarily be considered a lower quality or grade of butter and its value may be several cents a pound under that of top grade butter. The type of butter made from such off-flavored cream therefore represents a considerable economic loss.

The present invention provides an improved method of treating such off-flavored cream whereby it is possible to remove the off-flavors to such an extent that they are unobjectionable, leaving the cream in much the same condition as it was originally, that is, in regard to flavor, aroma and composition.

In explanation of the changes which produce an off-flavored cream, it may be pointed out that milk and cream are emulsions of milk fat in milk serum, the latter consisting of milk proteins, milk albumen, milk salts, milk sugar, vitamins, enzymes, etc. Fresh milk or cream is a sweet pleasant liquid substance of excellent food quality. But when cream, after it has been separated from the milk, or when milk before separation of the cream therefrom, is handled or held under adverse temperature conditions, it undergoes chemical and biological changes, the latter being of a two-fold nature, i. e. souring and putrefaction. Souring results from the development of lactic acid formed by the growth and activity of certain micro organisms upon milk sugar. The action of these bacteria under favorable conditions is very rapid and in a relatively short time they are able to convert a large portion of the milk sugar into lactic acid, which reacts upon the proteins, especially the casein, and promotes coagulation or clotting. The second form of decomposition is due to the action of microscopic organisms, ordinarily known as putrifying bacteria, upon the proteins, with resulting decomposition of the proteins and the formation of products which have disagreeable flavors and aromas. Cream which has been improperly handled will usually develop into an off-flavored product having both sour and putrefactive flavors.

I have found that it is possible to remove the objectionable off-flavors from such an off-flavored cream by admixing it with good flavored buttermilk, such as is produced from fresh sweet cream in the manner above described, treating the mixture with a suitable neutralizing agent and then separating the mixture by means of a cream separator to give a concentrated product with a high percentage of butter fat, and then diluting the concentrated cream with milk or buttermilk to a suitable dilution for churning, after which the cream is treated for the manufacture of butter therefrom in the ordinary manner.

The dilution of the off-flavored cream with high grade buttermilk dilutes the serum content of the cream and appears to dissolve constituents or otherwise act upon the constituents imparting an off-flavor, so that the concentrated cream subsequently separated from the diluted mixture is freed, or largely so, from the objectionable off-flavored constituents. These off-flavored constituents are constituents formed from the milk serum by the action of the microscopic organisms upon the milk sugar and the milk proteins, while the milk fat undergoes little if any change. Accordingly, by dissolving or otherwise removing the objectionable off-flavored constituents, the greater part of the off-flavored constituents can be removed from the diluted cream when it is subjected to separation and a concentrated cream product formed therefrom.

The buttermilk which is admixed with the off-flavored cream is high grade buttermilk such as that produced from ripened cream churnings. It has a lactic flavor practically equivalent to that of the regular butter culture and it possesses the so-called delicate and desirable butter flavor and aroma.

In the practice of the present invention, this good favored buttermilk is admixed with the off-flavored cream in the proportions of about one part of the cream to from one to five parts of the buttermilk. The quantity of the buttermilk to be used depends upon the type of cream being treated. If a cream possesses considerable off-flavor, the amount of buttermilk may be as much as five parts to one part of the cream; while if the cream is off-flavored only to a small extent, only around one part of buttermilk may be added to one part of the cream.

The mixture of cream and high grade buttermilk is then treated with a neutralizing agent to bring it to a proper degree of neutrality, such as is represented by a pH valve of between 6.0 and 8.0. This treatment of the mixture of cream and buttermilk with a neutralizing agent is important in order that the casein may be held in suspension in the milk serum during separation of the diluted cream in a cream separator; otherwise, during the separating operation, some of the casein will be deposited in the separator discs and bowl as a sludge which soon clogs up the machine. It is possible to treat the admixture of cream and buttermilk with either caustic soda or sodium carbonate for the purpose of dissolving the suspended casein, but if these reagents are used alone the mixture must be made distinctly alkaline and a somewhat foreign favor may be imparted to the resulting cream. I have found, however, that if the caustic soda or sodium carbonate solution has mixed with it about 20% of di- or trisodium phosphate, sodium citrate, or sodium tartrate, it is not necessary to use as much of the caustic soda as when caustic soda is used alone, and that the imparting of foreign flavors can be avoided.

Accordingly, in practicing the invention, it is advantageous to make use of a neutralizing agent consisting of about four parts of caustic soda, or its equivalent of sodium carbonate, and about one part of sodium citrate, sodium tartrate, or sodium phosphate. I consider the tri-sodium phosphate preferable, because of its cheapness, to the disodium phosphate. The citrate, tartrate and phosphate mentioned are casein solvents, and, when used in connection with the caustic soda or sodium carbonate solution, aid in holding or maintaining the casein in colloidal suspension during the separating operation. While certain neutralizing agents other than caustic soda may also be used, my investigations indicate that caustic soda is preferable. I have referred to neutralizing the cream to a pH value of about 6.0 to 8.0. With certain creams I have found it possible to effect the separating operation at a pH of as low as about 6.0, although I consider it preferable usually to work at a pH value of about 7.0.

After the mixture of cream and buttermilk has been neutralized, it is heated to about 100° F. and then separated in the usual manner by means of a cream separator. This separator should be so designed and constructed as to yield a concentrated cream containing around 60 to 70% of butter fat. This separation of the diluted mixture of cream and buttermilk results in removing from admixture with the butter fat the greater part of the original off-flavored serum, and leaves admixed with the butter fat in the concentrated cream only a relatively small amount of serum which is made up mostly of the high grade buttermilk with a relatively smaller admixture of serum of the character originally present in the off-flavored cream.

The separated concentrated cream is then diluted to a butter fat content suitable for churning, for example, to about 30 to 35% butter fat, by addition of buttermilk, whole milk, skim milk, or reconstructed milk. If a high quality buttermilk from ripened cream is used, no additional starter culture may be needed. If, however, whole milk or skim milk or reconstructed milk is used to dilute the concentrated cream, a starter culture is essential in order to impart the desirable butter flavor and aroma, as well as to build up the acids to the proper point before churning. The diluted cream is then handled and churned in the usual manner, and results in the production of a high grade butter.

It will be evident that the amount of buttermilk admixed with the off-flavored cream can be varied, for example, from one up to five parts of buttermilk for one part of cream. The greater the amount of buttermilk added to the cream, the greater the dilution of the serum admixed with the butter fat. For example, if an off-flavored cream is treated which contains 32% of butter fat, there will be present about 68% of the off-flavored serum. If an equal amount of high grade buttermilk is admixed with the off-flavored cream, there will result a mixture containing only about 16% of butter fat and the remaining 84% of serum will be made up of 34% of off-flavored serum admixed with 50% of buttermilk, so that the serum with which the butter fat is admixed is made up of a much larger proportion of buttermilk than of the original off-flavored serum. If this diluted mixture is now separated to give a concentrated cream with a fat content of 70%, the remaining 30% of serum will be made up of about 18% of high grade buttermilk and only about 12% of the original off-flavored serum. When the concentrated cream is further diluted with milk or buttermilk before churning, the percentage of original off-flavored serum present in the diluted cream will be still further reduced to around 6% or less of the total serum, and, when the cream is ripened and churned and the butter fat globules coalesced into butter, the butter will be sufficiently free from any objectionable off-flavor, and will have imparted to it the desirable butter flavor and aroma from the ripening treatment so that it will be a high grade butter.

When the cream treated has a larger proportion of buttermilk admixed with it before the concentrating or separating treatment, the percentage of off-flavored serum remaining in the concentrated cream will be still further reduced. For example, if a cream containing 32% of butter fat is diluted with five times its volume of high grade buttermilk and the diluted mixture then separated to form a concentrated cream containing around 70% of butter fat, only about 3½% of the original off-flavored serum will be present in the resulting 70% cream, and this small percentage will be diluted with several times its volume of the admixed buttermilk, and still more highly diluted with the added milk or buttermilk when the concentrated cream is diluted before churning.

It will thus be seen that the present invention provides an improved method of treating off-flavored cream for the production of high grade cream and butter therefrom, this treatment involving the dilution of the off-flavored cream with buttermilk for the purpose of dissolving and removing and diluting the off-flavors, followed by separation of the diluted cream to give a concentrated cream containing a relatively very small percentage of the off-flavored serum remaining with it in a diluted state, which dilution is further increased by the dilution of the concentrated cream before churning.

It will further be seen that the present invention includes a treatment of the diluted cream, diluted with the high grade buttermilk, with alkaline substances which neutralize the excess acidity and which promote the solution or colloidal suspension of the proteins in such a manner that the butter fat may be separated from the serum without undue deposition of sludge in the separator during the separating treatment.

I am aware that attempts have been made to wash cream with water, but the present method has important advantages over such water washing. The buttermilk used for diluting cream in the present process has a pronounced dissolving action on the off-flavors and removes them in a far more effective manner than does water washing; while such treatment leaves the diluted and subsequently concentrated cream with the butter fat in a highly concentrated state admixed with serum which contains only a small percentage of the original off-flavored serum. The solvent action of buttermilk for the off-flavored constituents is not only superior to that of water, but the buttermilk is itself similar to or the equivalent of a starter and provides a serum of high quality admixed with a relatively small amount of the original serum.

I am also aware that attempts have been made to separate butter fat from cream with the idea that the butter fat could be transported at a lower cost over comparatively long distances from the producing points to the centralizing points, but such a separated butter fat product has to be reconstructed back into cream before it can be used, which is not the case with the process of the present invention where the cream is converted from an off-flavored cream to a cream of high quality well adapted for the manufacture of high grade butter therefrom by ripening and churning in the usual manner.

I claim:

1. The improvement in the treatment of off-flavored cream, which comprises admixing the cream with buttermilk, separating the resulting mixture to remove the greater part of the serum therefrom and to produce a concentrated cream product, diluting the concentrated cream with milk or buttermilk and churning the resulting diluted cream for the production of butter therefrom.

2. The improvement in the treatment of off-flavored cream, which comprises diluting the cream with an amount of buttermilk equal to or greater than the amount of the cream and separating the diluted mixture to remove the greater part of the admixed serum from the butter fat and to give a cream admixed with a serum the greater part of which is made up of the added buttermilk.

3. The improvement in the treatment of off-flavored cream, which comprises diluting the cream with an equal or greater amount of buttermilk, adding to the mixture a neutralizing agent to promote suspension or solution of proteins and to give a pH value of about 6.0 to 8.0, and separating the resulting diluted and neutralized cream to remove the greater part of the serum therefrom.

4. The improvement in the treatment of admixed off-flavored cream and buttermilk, which comprises adding thereto a nuetralizing agent to bring the mixture to a pH value of between 6.0 and 8.0 and to promote solution or suspension of proteins, and separating the resulting mixture to remove the greater part of the serum therefrom.

5. The improvement in the treatment of a mixture of off-flavored cream and buttermilk, which comprises adding thereto a neutralizing agent consisting of about four parts of caustic soda or its equivalent of sodium carbonate and one part of sodium citrate, sodium tartrate or sodium phosphate, to bring the mixture to a pH value of between 6.0 and 8.0, and separating the resulting mixture to remove the greater part of the serum therefrom.

6. The improvement in the treatment of off-flavored cream, which comprises admixing the cream with an equal or greater amount of buttermilk, adding a neutralizing agent to give a pH value of around 6.0 to 8.0 and to promote solution or suspension of proteins in the mixture, separating the resulting mixture to remove the greater part of the serum therefrom and to give a concentrated cream containing a high percentage of butter fat, diluting the concentrated cream and churning the same to make butter therefrom.

7. The improvement in the treatment of off-flavored cream, which comprises admixing the same with an equal or greater amount of buttermilk, treating the mixture with a neutralizing agent to bring it to a pH value of around 6.0 to 8.0, separating the mixture to give a concentrated cream containing around 60 to 70% of butter fat, diluting the concentrated cream with buttermilk or milk, ripening the cream and churning the same.

8. The improvement in the treatment of off-flavored cream, which comprises diluting the same with an equal or greater amount of buttermilk, neutralizing the excess acidity of the mixture with a neutralizing agent to give a pH value of around 6.0 to 8.0, separating the diluted cream to form a concentrated cream having a high content of butter fat, diluting the concentrated cream with high quality buttermilk from ripened cream which will serve as a starter, ripening the cream and churning the same to form butter therefrom.

In testimony whereof I affix my signature.
CLINTON HENRY PARSONS.